Nov. 4, 1969　　　H. L. WILLIAMS ET AL　　　3,476,868
CABLE SPREADER
Filed March 13, 1968　　　　　　　　　　2 Sheets-Sheet 1

Inventors
Harrison L. Williams &
Robert A. Tucker
By Hume, Clement, Hume, & Lee Attys.

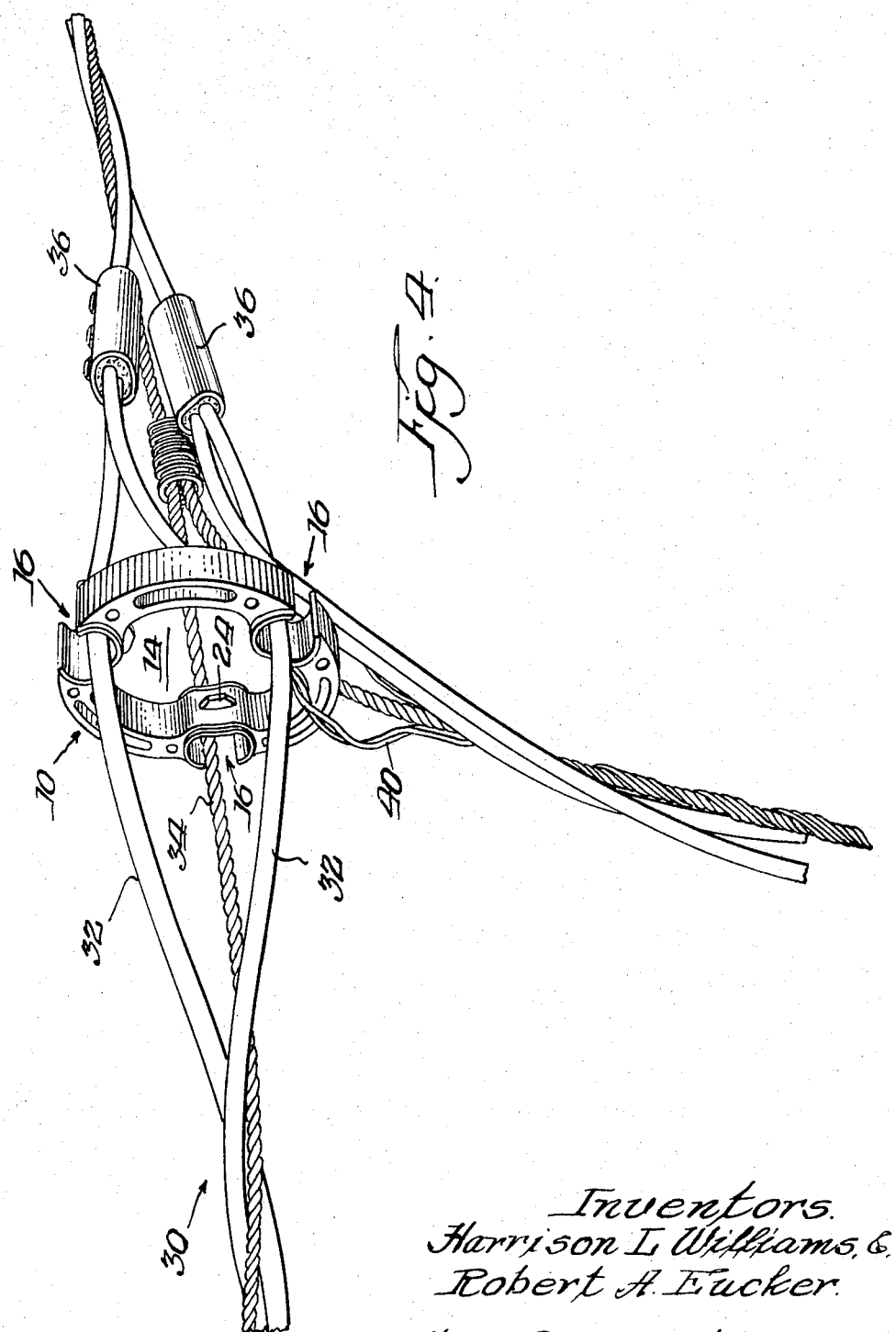

United States Patent Office 3,476,868
Patented Nov. 4, 1969

3,476,868
CABLE SPREADER
Harrison L. Williams, Euclid, and Robert A. Eucker, Brooklyn, Ohio, assignors to Preformed Line Products Company, Cleveland, Ohio, a corporation of Ohio
Filed Mar. 13, 1968, Ser. No. 712,807
Int. Cl. H02g 7/12, 7/20
U.S. Cl. 174—43                 9 Claims

ABSTRACT OF THE DISCLOSURE

A multiplex cable spreader is formed of a unitary, generally annular insulator body having a plurality of equidistant, peripheral C-shaped cable receptacles having openings directed radially outwardly. The openings are each adapted to receive one strand of cable. The receptacles each have opposite, concave side walls and preferably have a convex hump opposite the opening to urge the cable toward the side wall. The cable spreader is preferably symmetrical in design, and can be utilized without lashing the cable strands into the receptacles.

---

The present invention relates to an improved multiplex cable spreader.

Multiplex cables, especially twisted multiplex cables, are widely used for transmitting electric power. A common example is a triplex cable which includes a bare neutral cable twisted together with a pair of insulated wires. While such cables have distinct advantages, it has been difficult to make a service connection in order to deliver current from a span of cable to a point where it is to be utilized. Accordingly, devices known as cable spreaders have been developed to separate the cable strands of a multiplex cable, allowing the convenient installation of a service connection.

A number of cable spreader designs have been developed but all have suffered from a number of disadvantages. Most cable spreaders require that the individual cable strands be lashed or tied to the spreader to prevent it from becoming disengaged. While some designs have used clamps to eliminate the need for lashing, they are complicated and expensive to produce. Finally, it is essential with most cable spreaders that they be installed with the proper orientation. This, along with the requirement for lashing, presents some difficulty, as well as time wastage, for a person working on an electrical line.

Generally, the present invention provides an improved multiplex cable spreader which comprises a unitary insulator of generally annular configuration, and having a plurality of equi-distant, peripheral, generally C-shaped cable receptacles. The cable receptacles have openings or slots directed radially outwardly from the outside of the insulator, the slots being at least equal in width to the largest-diameter strand of the mutiplex cable on which it is to be employed. The C-shaped receptacles are defined by opposite, concave side walls so that the widest point in the interior of the receptacles is relatively wider than the opening at the outer periphery of the cable spreader.

The invention, both as to its organization and method of operation, together with the objects and advantages thereof, will be best appreciated from the following detailed description taken together with the drawings, in which:

FIGURE 4 is a perspective view of the preferred embodiment of the present invention in spreading engagement with a triplex cable, and also showing a service connection anchored by a dead end.

Figure 1:
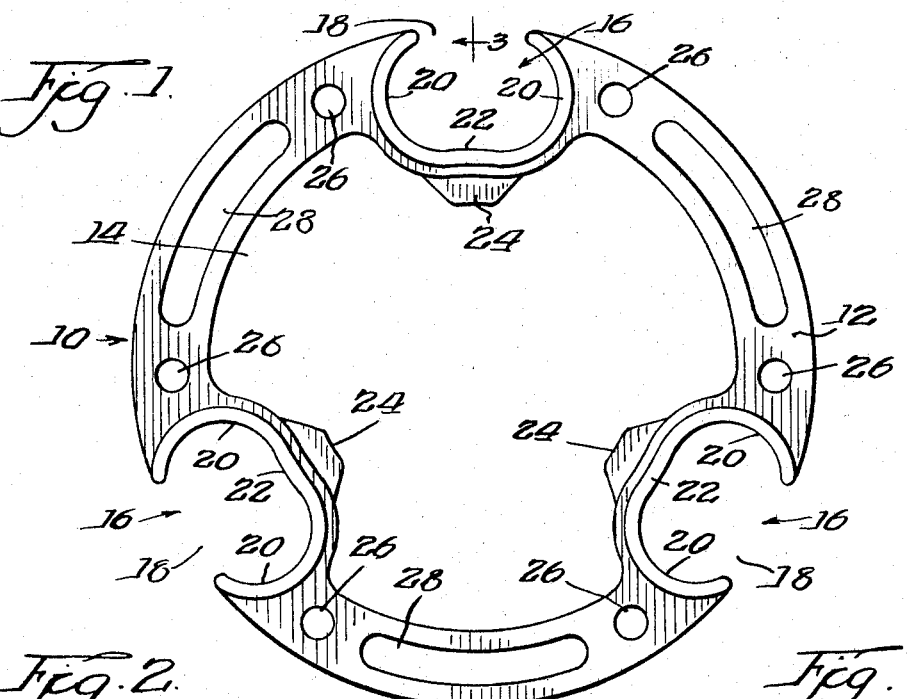
FIGURE 1 is a front elevation view of the preferred embodiment of the present invention for use with triplex cable.
Figure 2:
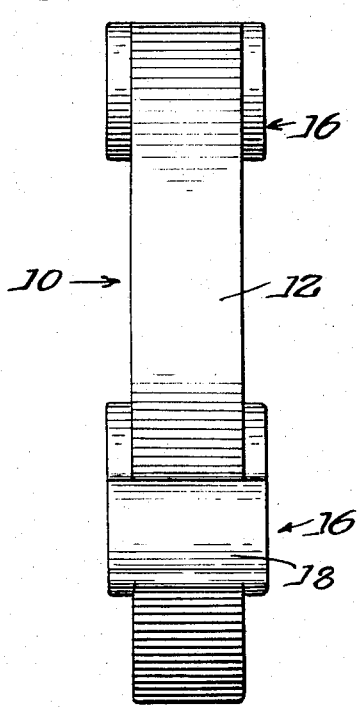
FIGURE 2 is a side elevation view of the device shown in FIGURE 1.
Figure 3:
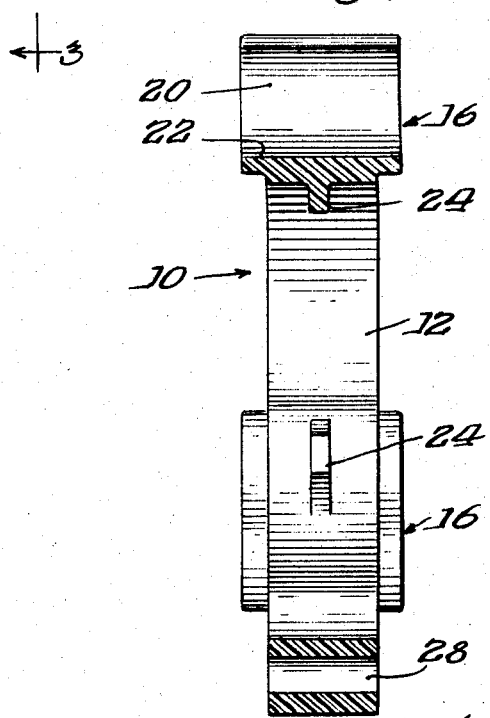
FIGURE 3 is a cross-sectional view taken along line 3—3 of FIGURE 1.

Referring to the drawings, FIGURES 1-3 illustrate the preferred cable spreader of the present invention, generally indicated by reference numeral 10. Although the embodiment shown is designed for use with triplex cable, i.e., that having three separate cable strands, it will be understood that the invention is equally adaptable to other types of multiplex cable.

As shown in FIGURE 1, the cable spreader 10 is formed by a generally annular insulator 12 preferably having a relatively large central aperture 14. Around the periphery of the insulator 12 are a plurality of C-shaped cable receptacles generally 16. The number of cable receptacles 16 must be equal to the number of strands in the multiplex cable to be spread. In the embodiment shown, there are three such receptacles 16 for use with triplex cable. Each of the C-shaped receptacles 16 has an opening 18 at the outside edge of the annular insulator 12, and directed radially outwardly from the insulator 12.

In order to form the C-shape of the cable receptacles 16, it is necessary that each have opposite, facing, concave side walls 20. This design makes possible the easy insertion of a cable strand through the opening 18, and the retention thereof by the receptacle 16 as hereinafter described.

Preferably, each of the C-shaped cable receptacles 16 has a convex hump 22 on the inner portion opposite the opening 18. The convex hump 22 urges a cable in the receptacle toward one of the concave side walls 20, thus decreasing the chances that the cable spreader 10 will become disengaged from the cables in use, as described below. As shown in FIGURE 1, the convex hump 22 extends toward the opening 18 a distance less than the depth of its associated receptacle 16.

In the most preferred embodiment, the interior of the cable spreader 10 is formed into inward protrusions 24 opposite the openings 18 in the cable receptacles 16. The protrusions 24 divide the central aperture 14 of the annular insulator 12 into equal segments, making convenient the retention of a dead end. The most preferred device may also include tie wire openings 26 in the annular insulator 12 adjacent to the cable receptacles 16. Although tie wires are not generally required to secure cables into the receptacle, they may be employed under extreme conditions, and therefore, the tie wire openings 26 are preferably included in the device. Also included in the most preferred embodiment are elongated, arcuate slots 28 along the annular insulator 12 between the cable receptacles 16. These slots 28 aid in decreasing the weight of the device, and also, by eliminating areas of solid mass from the inner periphery to the outer periphery along any substantial portion of the insulator, allow for even cooling so that the cable spreader 10 may be easily manufactured by injection molding techniques from plastics such as (poly)vinyl chloride.

Referring to FIGURE 4, the cable spreader 10 of the present invention is shown in engagement with a twisted triplex cable, generally 30. The cable 30 includes two insulated strands 32 and a bare, ground strand 34, which also serves to support the triplex cable. As shown, the cable spreader 10 is inserted between the separated cables, with a strand 32, 34 in each of the C-shaped cable receptacles 16. Because the cable 30 is twisted, all of the strands 32, 34 will be biased radially inwardly toward the center of the cable spreader 10. The convex humps 22 and the bottom of the C-shaped cable receptacles 16 will urge the cable strands 32, 34 toward the opposite, concave side walls 20. This positioning of the cables minimizes the likelihood that one of the strands 32, 34 will come out under the force of high winds or the like.

Adjacent to the cable spreader 10, there are depicted service connections to each of the cable strands 32, 34. The service connections to the insulated strands 32 are preferably covered by insulated covers 36, while the connection to the bare neutral strand 34 is a simple compression connector 38, which need not be insulated. The service connection is preferably secured to the cable spreader 10 by a dead end 40 wrapped around at least one of the strands of the service connection. As shown in FIGURE 4, the dead end may be conveniently wrapped around the bare neutral strand 34 of the service connection, with the bight of the dead end passing through the center aperture 14 of the cable spreader 10, maintained in position between a pair of protrusions 24.

For simplicity of installation, it is preferred that all of the C-shaped cable receptacles 16 be identical, since one size is adaptable to many sizes of individual cable strands. The only essential requirement is that the openings 18 be at least equal to the diameter of the largest diameter strands in the multiplex cable being utilized. It is also preferred that the cable spreader 10 be of symmetrical design. Referring to FIGURE 1, the device should be symmetrical about a plane perpendicular to the plane of the annular insulator 12, and passing through the geometric center of one of the C-shaped cable receptacles 16 and the center of the annular insulator 12. This is the plane along which FIGURE 3 has been taken. This symmetry avoids any possibility of confusion in installing the cable spreader 10, since it makes no difference whatever which way it is rotated before it is forced between the strands of a multiplex cable.

As previously mentioned, (poly)vinyl chloride forms suitable material for forming the cable spreader of the present invention. However, it will be understood that other non-conductive materials may equally well be used to form the device. Included are porcelain, glass, and wood, as well as other rigid and semi-rigid synthetic plastics.

While the embodiments described herein are at present considered to be preferred, it will be understood that various modifications and improvements may be made therein without departing from the true spirit and scope of applicants' invention.

We claim:

1. A multiplex cable spreader comprising: a unitary generally annular insulator having a plurality of equidistant, peripheral, generally C-shaped cable receptacles, said receptacles having openings directed radially outwardly from the outside of said insulator, said openings at least equal in width to the diameter of the cable strands of said multiplex cable, and said receptacles each having opposite, concave side walls and a convex hump on the inner portion opposite said openings to urge a cable strand of said multiplex cable toward one of said side walls, said hump extending toward said opening a distance less than the depth of said receptacle.

2. A cable spreader as defined in claim 1 wherein said insulator has three generally C-shaped cable receptacles for use with triplex cable.

3. A cable spreader as defined in claim 1 wherein said insulator includes a tie wire opening adjacent to each cable receptacle for lashing cables into said receptacles with tie wires.

4. A multiplex cable spreader comprising: a unitary generally annular insulator having a plurality of equidistant peripheral, generally C-shaped cable receptacles, said receptacles having openings directed radially outwardly from the outside of said insulator, said openings at least equal in width to the diameter of the cable strands of said multiplex cable, and said receptacles each having opposite, concave side walls and a convex hump on the inner portion opposite said openings to urge a cable strand of said multiplex cable toward one of said side walls; and a plurality of protrusions on the inner sides of said cable receptacles, said protrusions defining regions around the interior of said insulator for engagement by the bight of a dead end.

5. A cable spreader as defined in claim 4 wherein said C-shaped cable receptacles are substantially identical.

6. A multiplex cable spreader comprising: a unitary, generally annular insulator having a plurality of equidistant, peripheral, generally C-shaped cable receptacles, said receptacles having openings directed radially outwardly from the outer periphery of said insulator, said openings at least equal in size to the cable strands of said multiplex cable, and said receptacles each having opposite, concave side walls and a convex hump opposite said opening to urge a cable strand toward one of said side walls, and said insulator having a relatively large central aperture; inward protrusions on the inner sides of said cable receptacles, said protrusions defining regions around the interior of said insulator for engagement by the bight of a dead end; said insulator further including an elongated, arcuate slot between each pair of cable receptacles to eliminate areas of solid mass from inner periphery to outer periphery along any substantial portion of said insulator; said cable spreader further characterized by symmetry about a plane perpendicular to said annular insulator and passing through the geometric center of one of said C-shaped openings and the geometric center of said annular insulator.

7. The cable spreader of claim 6 wherein said insulator has three generally C-shaped cable receptacles for use with triplex cable.

8. A cable connection comprising: a twisted, multiplex cable; a multiplex cable spreader formed by a unitary, generally annular insulator having a relatively large central aperture and a plurality of equidistant, peripheral, generally C-shaped cable receptacles having openings directed radially outwardly from the outside of said insulator, said openings at least equal in width to the diameter of the strands of said multiplex cable, and said receptacles each having opposite, concave side walls and a convex hump opposite said opening, the number of cable receptacles being equal to the number of cable strands included in in said multiplex cable, said cable spreader disposed between the cable strands of said multiplex cable, each of said cable strands passing through one of said C-shaped cable receptacles whereby to spread the strands of said multiplex cable; a service connection to said multiplex cable adjacent to said cable spreader; and a dead end looped through said central aperture of said annular insulator and wrapped around at least one of the cable strands of said service connection.

9. The cable connection of claim 8 wherein said multiplex cable is triplex cable and said cable spreader has three C-shaped cable receptacles.

References Cited

UNITED STATES PATENTS

| | | | |
|---|---|---|---|
| 267,609 | 11/1882 | Slafter | 174—111 X |
| 277,374 | 5/1883 | Strohm | 174—27 X |
| 1,089,642 | 3/1914 | Honold | 174—146 X |
| 1,205,069 | 11/1916 | Williams | 174—175 |
| 2,372,995 | 4/1945 | Whitmore | 174—174 |
| 2,887,524 | 5/1959 | Fulps | 174—146 X |
| 2,921,112 | 1/1960 | Dykstra et al. | 174—43 |
| 3,336,436 | 8/1967 | Markham | 174—146 |

OTHER REFERENCES

Mayer; German printed application No. 1,003,303, published Feb. 28, 1957.

LARAMIE E. ASKIN, Primary Examiner

U.S. Cl. X.R.
174—146, 174